(12) United States Patent
Lin

(10) Patent No.: US 10,725,318 B2
(45) Date of Patent: Jul. 28, 2020

(54) SURFACE RELIEF LIQUID CRYSTAL LENTICULAR DEVICE, MANUFACTURING METHOD, AND DISPLAY DEVICE

(71) Applicant: ZHANGJIAGANG KANGDE XIN OPTRONICS MATERIAL CO., LTD., Zhangjiagang, Jiangsu (CN)

(72) Inventor: Mingyan Lin, Zhangjiagang (CN)

(73) Assignee: ZHANGJIAGANG KANGDE XIN OPTRONICS MATERIAL CO., LTD., Zhangjiagang, Jiangsu (CN)

(*) Notice: Subject to any disclaimer, the term of this patent is extended or adjusted under 35 U.S.C. 154(b) by 93 days.

(21) Appl. No.: 15/744,376

(22) PCT Filed: Dec. 10, 2015

(86) PCT No.: PCT/CN2015/096889
§ 371 (c)(1),
(2) Date: Jan. 12, 2018

(87) PCT Pub. No.: WO2017/008432
PCT Pub. Date: Jan. 19, 2017

(65) Prior Publication Data
US 2018/0210219 A1     Jul. 26, 2018

(30) Foreign Application Priority Data

Jul. 13, 2015 (CN) .......................... 2015 1 0408298

(51) Int. Cl.
*G02F 1/1335* (2006.01)
*G02B 30/27* (2020.01)
(Continued)

(52) U.S. Cl.
CPC ............... *G02B 30/27* (2020.01); *G02B 3/14* (2013.01); *G02F 1/31* (2013.01); *H04N 13/302* (2018.05);
(Continued)

(58) Field of Classification Search
None
See application file for complete search history.

(56) References Cited

U.S. PATENT DOCUMENTS 5,973,763 A * 10/1999 Fujimura .............. G02F 1/1339
349/153
2004/0169920 A1* 9/2004 Uehara .................. G03B 21/56
359/443
(Continued)

FOREIGN PATENT DOCUMENTS

CN     101968595     2/2011
CN     102279500     12/2011
(Continued)

OTHER PUBLICATIONS

Son et al., English Machine Translation of KR-20140147923-A, Printed Jun. 7, 2019, https://www.kipo.go.kr/en/.*
(Continued)

*Primary Examiner* — Jessica M Merlin
*Assistant Examiner* — Mark D Teets
(74) *Attorney, Agent, or Firm* — McAndrews, Held & Malloy, Ltd.

(57) ABSTRACT

The present disclosure discloses a surface relief liquid crystal lenticular device, a manufacturing method therefor, and a display device with same. The liquid crystal lenticular device (60) includes an upper substrate module (171), a lower substrate module (161), a plano-concave lens module (64), a plurality of liquid crystal molecules (81), a sealing plastic structure (82), an electrically-conductive structure (83), and an external power supply (V). The lower substrate module (161) comprises a lower ITO electrode layer (62), a secondary ITO electrode (62*a*), an electrical blocking structure (62*b*), and several lower alignment targets (63). The upper substrate module (171) comprises an upper ITO electrode layer (72), a plurality of shading portions (75), and
(Continued)

several upper alignment targets (73). A plurality of liquid crystal lenticular lenses is driven by a voltage to achieve the aim of 2D and 3D switchable display.

16 Claims, 16 Drawing Sheets

(51) Int. Cl.
    *G02B 3/14*     (2006.01)
    *G02F 1/31*     (2006.01)
    *H04N 13/305*     (2018.01)
    *H04N 13/302*     (2018.01)
    *H04N 13/359*     (2018.01)
    *H04N 13/356*     (2018.01)

(52) U.S. Cl.
    CPC ......... *H04N 13/305* (2018.05); *H04N 13/356* (2018.05); *H04N 13/359* (2018.05)

(56) References Cited

U.S. PATENT DOCUMENTS

| | | | |
|---|---|---|---|
| 2006/0114374 A1 | 6/2006 | Segawa et al. | |
| 2007/0019132 A1* | 1/2007 | Kim | B29C 43/021 349/95 |
| 2008/0013002 A1* | 1/2008 | Hong | G02B 3/12 349/15 |
| 2010/0181022 A1* | 7/2010 | Zuidema | G02B 3/0012 156/272.2 |
| 2010/0195203 A1* | 8/2010 | Zuidema | G02B 3/005 359/463 |
| 2014/0029087 A1 | 1/2014 | Yoon et al. | |
| 2015/0056419 A1* | 2/2015 | Liu | B41J 3/407 428/195.1 |
| 2015/0077670 A1* | 3/2015 | Son | G02B 27/2214 349/33 |
| 2016/0187760 A1* | 6/2016 | Kim | G02F 1/29 349/139 |

FOREIGN PATENT DOCUMENTS

| | | |
|---|---|---|
| CN | 203275846 | 11/2013 |
| CN | 104216131 | 12/2014 |
| CN | 104977772 | 10/2015 |
| CN | 204989713 | 1/2016 |
| JP | 2009528565 A | 8/2009 |
| KR | 20010072397 A | 7/2001 |
| KR | 20140147923 A * | 12/2014 |

OTHER PUBLICATIONS

International Search Report corresponding to International Patent Application No. PCT/CN2015/096889, dated Apr. 20, 2016.

* cited by examiner

SURFACE RELIEF LIQUID CRYSTAL LENTICULAR DEVICE, MANUFACTURING METHOD, AND DISPLAY DEVICE

CROSS-REFERENCE TO RELATED APPLICATIONS/INCORPORATION BY REFERENCE

This application is a 371 of International Patent Application No. PCT/CN2015/096889, filed Dec. 10, 2015, entitled "SURFACE RELIEF LIQUID CRYSTAL LENTICULAR DEVICE, MANUFACTURING METHOD, AND DISPLAY DEVICE," which claims priority to Chinese patent application No. 201510408298.4, filed Jul. 13, 2015, entitled "SURFACE RELIEF LIQUID CRYSTAL LENTICULAR DEVICE, MANUFACTURING METHOD, AND DISPLAY DEVICE".—The above-identified applications are hereby incorporated herein by reference in their entirety.

TECHNICAL FIELD

The present disclosure falls within the field of glasses-free 3D image display, belongs to the technical field of liquid crystal lenticular devices, and more particularly relates to a technology of using a surface relief method to achieve the aim of 2D and 3D switchable display.

BACKGROUND

FIG. 1 shows a schematic diagram of a common 2D and 3D image switchable display. The common 2D and 3D image switchable display 10 comprises a liquid crystal view separator 12, usually, which is installed in front of a screen of a liquid crystal display 11. For a view position of a viewer 13, an installation method for installing the liquid crystal view separator 12 in front of the screen of the liquid crystal display 11 is hereinafter referred to as a front installation method for short.

Besides, under the driving of an external appropriate electrical voltage V, the liquid crystal view separator 12 may present a transparent light penetration state to achieve an effect of 2D image display, or present a view separation state to achieve an effect of 3D image display.

Generally, the liquid crystal view separator 12 may consist of a liquid crystal lenticular device or a liquid crystal parallax barrier device. The related art of the present disclosure belongs to the field of liquid crystal lenticular devices, in particular to the field of technologies of using a surface relief method to achieve the aim of 2D and 3D switchable display. The prior art is only illustrated herein below for a common surface relief method liquid crystal lenticular device.

FIG. 2 shows a composition schematic diagram of a surface relief liquid crystal lenticular device. The structure shown in FIG. 2 is disclosed in American Patent U.S. Pat. No. 6,069,650 and described with reference to FIG. 3 in the description.

The surface relief liquid crystal lenticular device 15 mainly includes a conventional lenticular sheet 30, two ITO electrode layers 34, 37, an electro-optic material 38 with an electrically changeable refractive index, and a transparent planar substrate 36. The conventional lenticular sheet 30 consists of several parallel lenticular modules 16, and each parallel lenticular module 16 consists of convex lenses optically, is made of transparent polymeric materials, and can be generated by molding, machining or photolithographic process. The transparent planar substrate 36 consists of flat transparent glass or plastic materials. The two ITO electrode layers 34, 37 respectively cover a surface 32 of the parallel lenticular module 16 and a surface 34 of the transparent planar substrate 36. Space between the two surfaces is full of the electro-optic material 38 with an electrically changeable refractive index. The electro-optic material 38 with an electrically changeable refractive index may be liquid crystal material, and generally, may be nematic liquid crystal material.

A technology of the surface relief liquid crystal lenticular device 15 disclosed in the patent U.S. Pat. No. 6,069,650 only pertains to theoretical structure formation, and does not meet requirements of a common liquid crystal technology. For example, the ITO electrode layer 34 is arranged on an arc surface of a lenticular lens, a uniformly-distributed parallel electric field cannot be formed between the ITO electrode layer 34 and the ITO electrode layer 37. Finally, liquid crystal molecules cannot be arranged in the same direction.

FIG. 3 shows a composition schematic diagram of an improved surface relief based liquid crystal lenticular device. The structure shown in FIG. 3 is disclosed in American Patent US20080259233 and described with reference to FIG. 2 and FIG. 3 in the description.

The surface relief based liquid crystal lenticular device 50 is improved for the defects of the patent U.S. Pat. No. 6,069,650. Namely, an ITO electrode is moved from an arc surface of a lens to a plane. The surface relief based liquid crystal lenticular device 50 mainly includes upper and lower transparent substrates 39, 41, upper and lower ITO electrode layers 43, 45, a plano-concave lens module 47, and a plurality of liquid crystal molecules 49. The plano-concave lens module 47 has a refractive index $n_p$; and the liquid crystal molecules 49 may be nematic liquid crystal materials, and have the characteristics of birefringent optics in which an ordinary refractive index is $n_o$ and an extraordinary refractive index is $n_e$, where $n_o=n_p$, and $n_e>n_p$. The upper and lower ITO electrode layers 43, 45 are connected to a power supply V.

Besides, the surface relief based liquid crystal lenticular device 50 is installed in front of a liquid crystal screen (unmarked in the figure), which is used to display a 2D or 3D image (unmarked in the figure). After passing through a polarizer on the outermost layer of the liquid crystal screen, a light source of the 2D or 3D image becomes a light source 53 for linear polarization, and a polarization direction thereof vertical to a paper surface.

Without an additional electric field, namely V=OFF, arrangement of the nematic liquid crystal molecules 49 has the characteristics that an optical axis is vertical to the paper surface. For an incident light 53, the extraordinary refractive index $n_e$ is sensed because that the light polarization direction is parallel to the optical axes of the liquid crystal molecules 49. Besides, when the incident light 53 penetrates through the plano-concave lens module 47, due to $n_e>n_p$, the incident light 53 is effected by a convex lens, the above-mentioned optical characteristics are applicable to display of a 3D image.

Besides, as shown in FIG. 4, under an additional electric field, namely V=ON, arrangement of the nematic liquid crystal molecules 49 has the characteristics that an optical axis is parallel to the paper surface and vertical to the upper and lower ITO electrode layers 43, 45, namely parallel to the direction of the electric field (unmarked in the figure). For an incident light 53, the ordinary refractive index $n_o$ is sensed because the light polarization direction is vertical to the optical axes of the liquid crystal molecules 49. Besides, when the incident light 53 penetrates through the plano-concave lens module 47, due to $n_o=n_p$, the incident light 53 can directly penetrate through the plano-concave lens module 47 without any influence of the plano-concave lens module 47, and therefore the abovementioned optical characteristics are applicable to display of a 2D image.

A technology of the surface relief based liquid crystal lenticular device 50 disclosed in the patent US20080259233 pertains to theoretical structure formation, and does not meet requirements of a common liquid crystal cell technology. For example, the plano-concave lens module 47 and the lower ITO electrode layer 45 are not provided with an alignment film layer (1), a spacing layer (2), an electrically connected structure (3), a sealing plastic structure (4) or other structures. Finally, the surface relief based liquid crystal lenticular device 50 cannot form an module which is truly producible and usable.

In conclusion, the above three liquid crystal lenticular devices all have the characteristics of achieving the changeable refractive index by liquid crystal molecules. Therefore, the above common technologies can fall within the technical field of liquid crystal dependent liquid crystal lenticular devices.

SUMMARY

The present disclosure discloses a surface relief liquid crystal lenticular device, which comprises: a lower substrate module, consisting of a lower transparent substrate, a lower ITO electrode layer, a secondary ITO electrode, an electrical blocking structure, and several lower alignment targets; an upper substrate module, consisting of an upper transparent substrate, an upper ITO electrode layer, a plurality of shading portions, several upper alignment targets, and an upper alignment film; a plano-concave lens module, made of a transparent material, and including a plurality of concave lens surfaces, a sealing plastic surface, a plurality of spacing surfaces, and a lower alignment film, the plano-concave lens module is arranged on the lower ITO electrode layer of the lower substrate module; a plurality of liquid crystal molecules, arranged in the concave lens surfaces, and driven by the upper and lower ITO electrode layers and a voltage of an external power supply, so as to form a plurality of liquid crystal lenticular lenses; a sealing plastic structure, arranged on the sealing plastic surface, and used to connect and fix the upper substrate module and the lower substrate module and to seal the plurality of liquid crystal molecules; and an electrically-conductive structure, arranged on the secondary ITO electrode to connect and conduct the upper ITO electrode layer, wherein the external power supply is electrically connected to the lower ITO electrode layer and the secondary ITO electrode, the plurality of liquid crystal lenticular lenses being driven by an appropriate V to achieve an aim of 2D and 3D switchable display.

Preferably, both the lower transparent substrate and the upper transparent substrate are made of transparent glass.

Preferably, the lower ITO electrode layer, the secondary ITO electrode and the electrical blocking structure are arranged on the same surface of the lower transparent substrate, and the electrical blocking structure is arranged between the lower ITO electrode layer and the secondary ITO electrode.

Preferably, the lower ITO electrode layer and the secondary ITO electrode are electrically connected to the external power supply via a metal conducting wire, separately.

Preferably, the plurality of shading portions are made of black photo-resistors.

Preferably, the lower alignment targets are arranged at four corners of the lower transparent substrate, and the lower alignment targets are made of metal materials; or, the upper alignment targets are arranged at four corners of the upper transparent substrate, and the upper alignment targets are made of metal materials.

Preferably, the transparent material of the plano-concave lens module has a refractive index $n_p$, and is selected from glass or UV-cured resin.

Preferably, when the transparent material of the plano-concave lens module is selected from UV-cured resin, the plano-concave lens module can be directly molded and arranged on the lower substrate module by means of a plate-to-plate UV-cured manufacturing process.

Preferably, the concave lens surfaces are used to fill the plurality of liquid crystal molecules, and the concave lens surfaces are selected from arc-shaped concave lens surfaces or polyhedral concave lens surfaces.

Preferably, when the concave lens surfaces are selected from arc-shaped concave lens surfaces, the arc-shaped concave lens surfaces have a radius R, a period unit width $P_L$, a lens height h and a bottom layer thickness t.

Preferably, the bottom layer thickness t is smaller than 10 μm.

Preferably, the sealing plastic surfaces are arranged on two sides of the plano-concave lens module.

Preferably, the plurality of spacing surfaces is arranged between the sealing plastic surfaces on two sides, and is used to support the upper substrate module to maintain a uniform cell gap, each spacing surface having a width S.

Preferably, the width S of the spacing surface is smaller than 10 μm.

Preferably, the lower alignment film is generated by coating the surfaces of the plurality of concave lens surfaces and the plurality of spacing surfaces with alignment liquid through processes comprising spin, or dipping, or relief printing, or inkjet printing, as well as a process of heat drying; and the plurality of liquid crystal molecules can be arranged in the same direction by the lower alignment film through a process of alignment, an alignment direction of the lower alignment film being a direction parallel to the long axes of the switchable liquid crystal lenticular lenses.

Preferably, the plurality of liquid crystal molecules are made of nematic liquid crystal materials, and have the characteristics of birefringent optics in which an ordinary refractive index is $n_o$ and an extraordinary refractive index is $n_e$, where $n_o=n_p$, and $n_e>n_p$.

Preferably, the plurality of shading portions has a period unit width $P_B$ and a line width B, where $P_B=P_L$, and $B>S$. The plurality of shading portions is aligned to the plurality of spacing surfaces in a one-to-one correspondence manner in arrangement position, and can shade light of cross-talk at the plurality of spacing surfaces.

Preferably, the upper ITO electrode layer, the upper alignment targets and the plurality of shading portions are arranged on the upper transparent substrate via a photo-lithography process, so as to form the upper substrate module.

Preferably, the upper alignment film is generated by coating the surfaces of the upper ITO electrode layer and the plurality of shading portions with alignment liquid through processes of spin, or dipping, or relief printing, or inkjet printing, as well as a process of heat drying; and the plurality of liquid crystal molecules can be arranged in the same direction by the upper alignment film through a process of alignment.

Preferably, the sealing plastic structure is made of UV-cured resin, and the sealing plastic structure can be arranged on the sealing plastic surface through processes of precision alignment, precision dispensing and UV pre-curing.

Preferably, the electrically-conductive structure is made of conductive silver paste, and the electrically-conductive structure can be arranged on the secondary ITO electrode through processes of precision alignment and precision dispensing.

Preferably, when the voltage of the external power supply satisfies V=OFF, the optical characteristic of the surface relief liquid crystal lenticular device is applicable to display of a 3D image; and when V=ON, the optical characteristic of the surface relief liquid crystal lenticular device is applicable to display of a 2D image.

Preferably, geometric structures of the upper alignment target and the lower alignment target can be separately selected from a square structure and a square ring structure having complementary geometric shapes, or can be separately selected from a circular structure and a circular ring structure having complementary geometric shapes, or can be separately selected from a cross structure and a reverse cross structure having complementary geometric shapes; and geometric dimensions of the upper alignment target and the lower alignment target can be ten to hundreds of microns.

The present disclosure discloses a display device, which comprises an image incident light and the surface relief liquid crystal lenticular device, wherein the image incident light has a linear polarization direction, an alignment direction of an upper alignment film being parallel to the polarization direction of the image incident light.

The present disclosure discloses a method for manufacturing the surface relief liquid crystal lenticular device, which includes: a first step: forming a lower ITO electrode layer, a secondary ITO electrode, an electrical blocking structure and several lower alignment targets on a lower transparent substrate through a photo-lithography process, so as to prepare a lower substrate module; forming an upper ITO electrode layer, a plurality of shading portions, and several upper alignment targets on an upper transparent substrate through a photo-lithography process, so as to prepare an upper substrate module; a second step: providing a plane mould, which has a mold structure opposite to that of a plano-concave lens module; filling the plane mould with liquid UV-cured resin through a process of precision inkjet printing; through precision photo-alignment to the lower substrate module in a vacuum cavity, precisely pressing the lower ITO electrode layer of the lower substrate module onto the plane mould and covering the liquid UV-cured resin; irradiating UV light to the liquid UV-cured resin in the plane mould, so as to cure the liquid UV-cured resin and mold the plano-concave lens module; and taking out the plano-concave lens module from the plane mould through a de-molding process, and fixedly arranging the plano-concave lens module on the lower ITO electrode layer of the lower substrate module; a third step: coating the surfaces of a plurality of concave lens surfaces and a plurality of spacing surfaces with alignment liquid through processes of spin, or dipping, or relief printing, or inkjet printing, as well as a process of heat drying, so as to generate a lower alignment film; and coating the surfaces of the upper ITO electrode layer and the plurality of shading portions with alignment liquid through processes of spin, or dipping, or relief printing, or inkjet printing, as well as a process of heat drying, so as to generate an upper alignment film; a fourth step: making an alignment direction of the upper alignment film parallel to a linear polarization direction of an image incident light through an alignment process, and making an alignment direction of the lower alignment film parallel to the long axes of switchable liquid crystal lenticular lenses; a fifth step: arranging a sealing plastic structure on a sealing plastic surface through processes of precision alignment, precision dispensing and UV pre-curing; a sixth step: drop filling a plurality of liquid crystal molecules into a concave lens surface through an On Drop Filling (ODF) process; a seventh step: arranging an electrically-conductive structure on the secondary ITO electrode through processes of precision alignment and precision dispensing; and an eighth step: bonding the upper substrate module and the lower substrate module through processes of precision alignment and vacuum attaching, and irradiating UV light to make the sealing plastic structure cured, so as to form the surface relief liquid crystal lenticular device.

Preferably, the alignment process is selected from a rubbing process or a photo-alignment process.

Preferably, the alignment liquid is made of a polyimide material.

The present disclosure improves the common surface relief liquid crystal lenticular device and gives a 2D and 3D switchable device that is truly producible and usable.

BRIEF DESCRIPTION OF THE DRAWINGS

In order to more clearly illustrate the technical solutions in the embodiments of the present disclosure or the related art, drawings needing to be used in descriptions of the embodiments or the related art will be simply introduced. Obviously, the drawings described below are only some embodiments in the present disclosure. On the premise of no creative work, a person of ordinary skill in the art can also obtain other drawings and implementation modes according to these drawings.

DETAILED DESCRIPTION OF THE EMBODIMENTS

Figure 1:
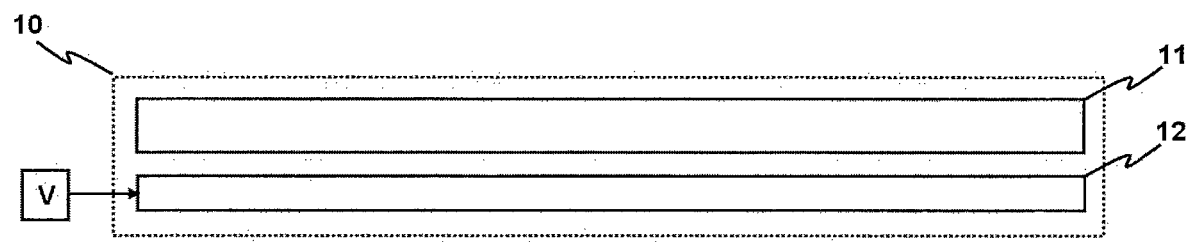
FIG. 1 shows a schematic diagram of a common 2D and 3D image switchable display.
Figure 1:
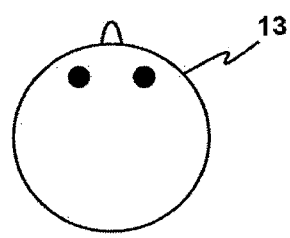
Figure 2:
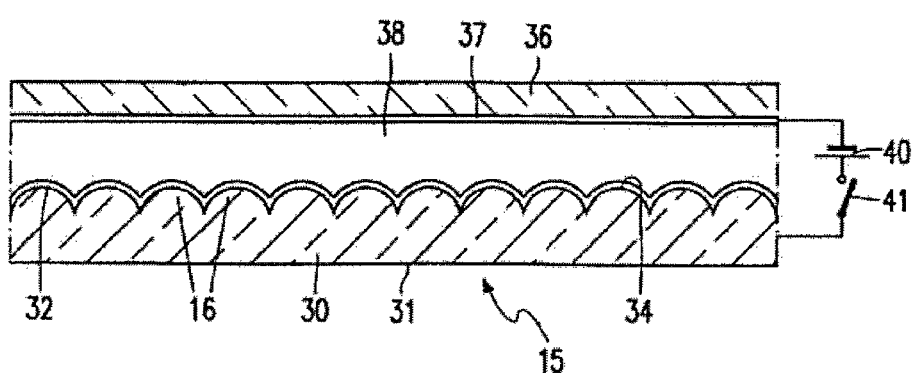
FIG. 2 shows a composition schematic diagram of a common surface relief liquid crystal lenticular device.
Figure 3:
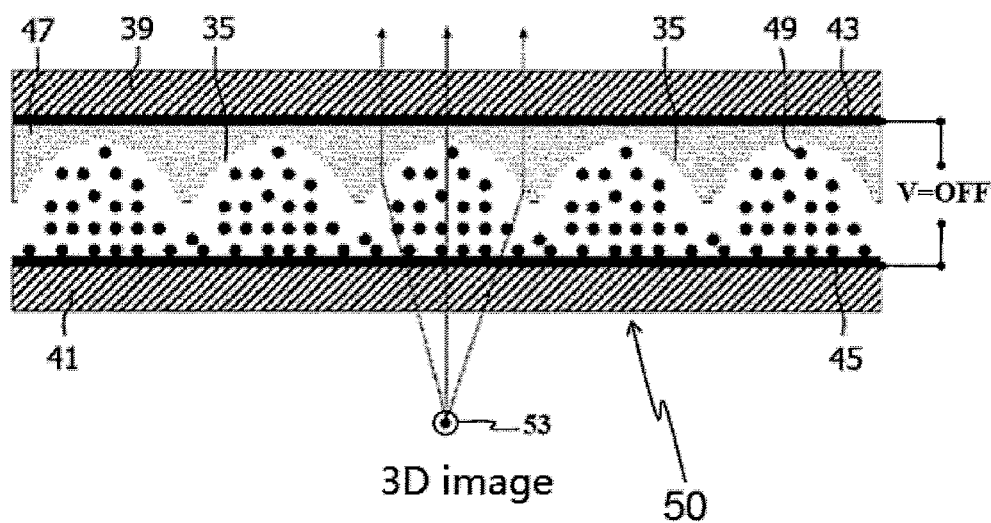
FIG. 3 shows a composition schematic diagram of a common surface relief liquid crystal lenticular device.
Figure 4:
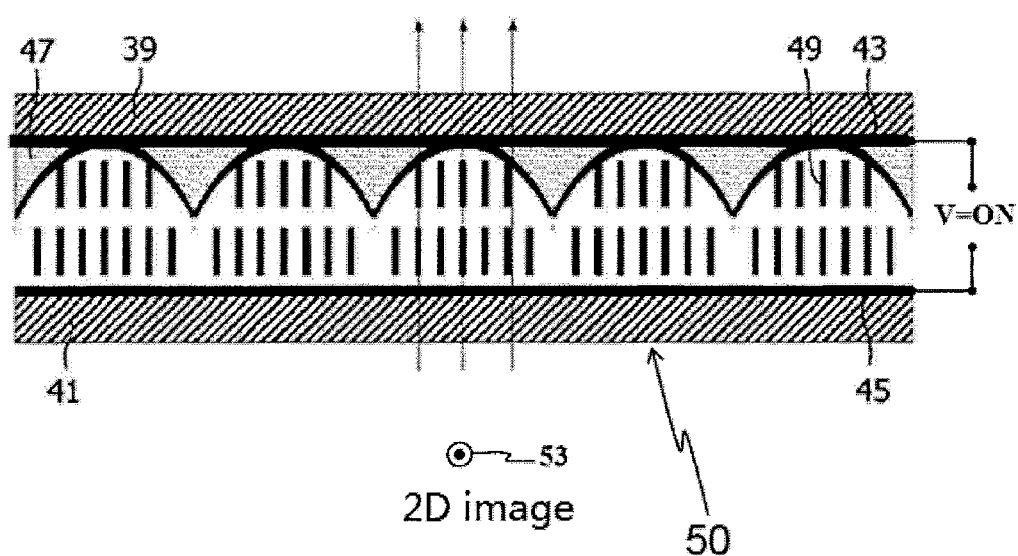
FIG. 4 shows a composition schematic diagram of a common surface relief liquid crystal lenticular device.
Figure 5:
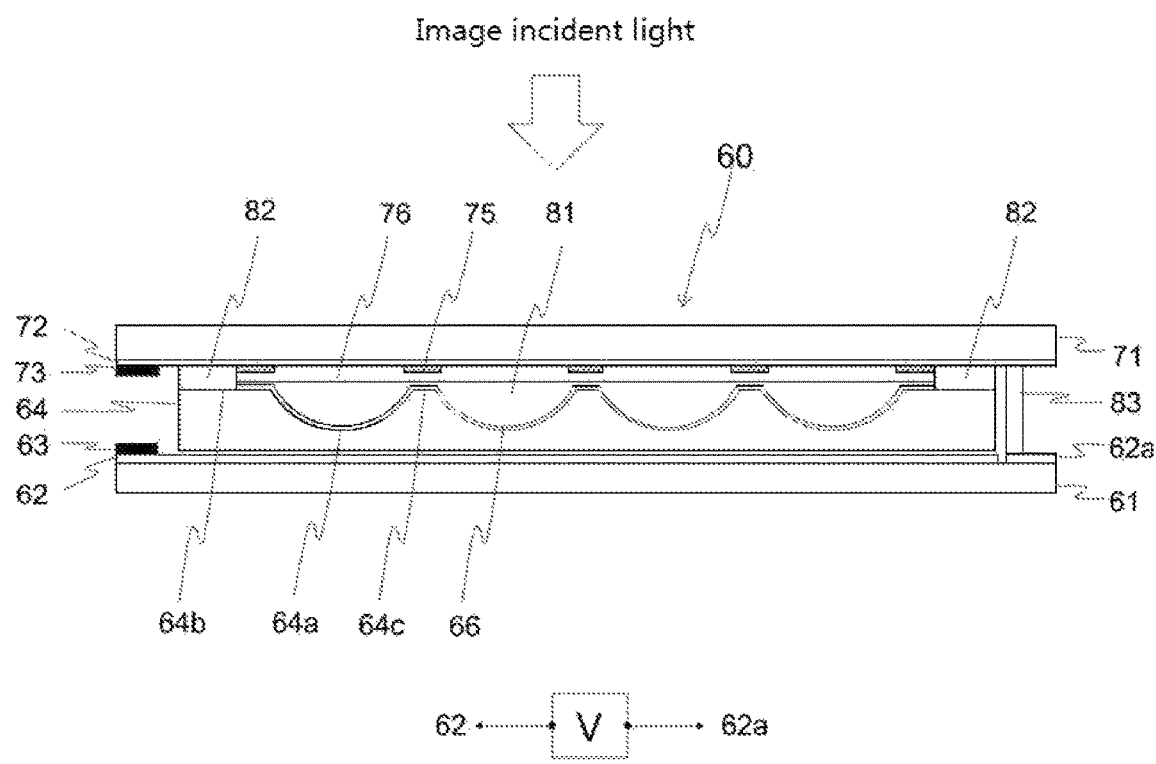
FIG. 5 shows a composition schematic diagram of a surface relief liquid crystal lenticular device according to the present disclosure.

FIG. 5 shows a composition schematic diagram of a surface relief liquid crystal lenticular device according to the present disclosure. The surface relief liquid crystal lenticular device 60 mainly comprises upper and lower transparent substrates 71, 61, upper and lower ITO electrode layers 72, 62, a secondary ITO electrode 62a, several upper and lower alignment targets 73, 63, upper and lower alignment films 76, 66, a plurality of shading portions 75, a plano-concave lens module 64, a plurality of liquid crystal molecules 81, a sealing plastic structure 82, an electrically-conductive structure 83, and an external power supply V.

Herein, said upper and lower only aim at convenience of illustration of each structure and relevance of arrangement positions, and are not intended to limit a relationship between upper and lower as shown in FIG. 5. That is, said upper and lower may have a relationship of reversal to each other. Herein, an upper substrate module 171 and a lower substrate module 161 are additionally defined, so as to more clearly illustrate the composition and process of each module.

Figure 6:
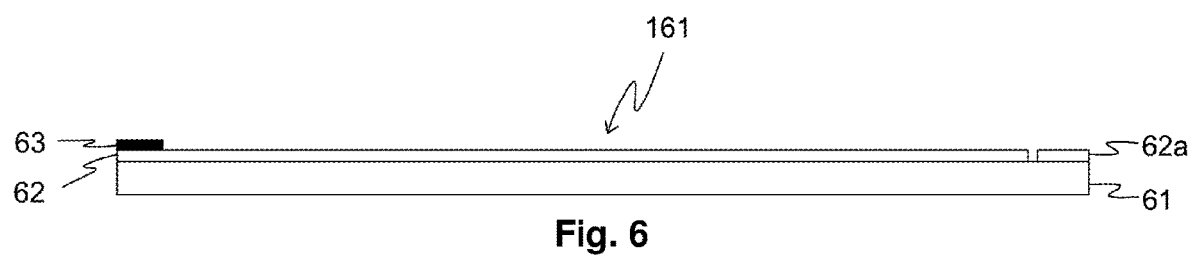
FIG. 6 shows a composition side view of a lower substrate module according to the present disclosure.
Figure 7:
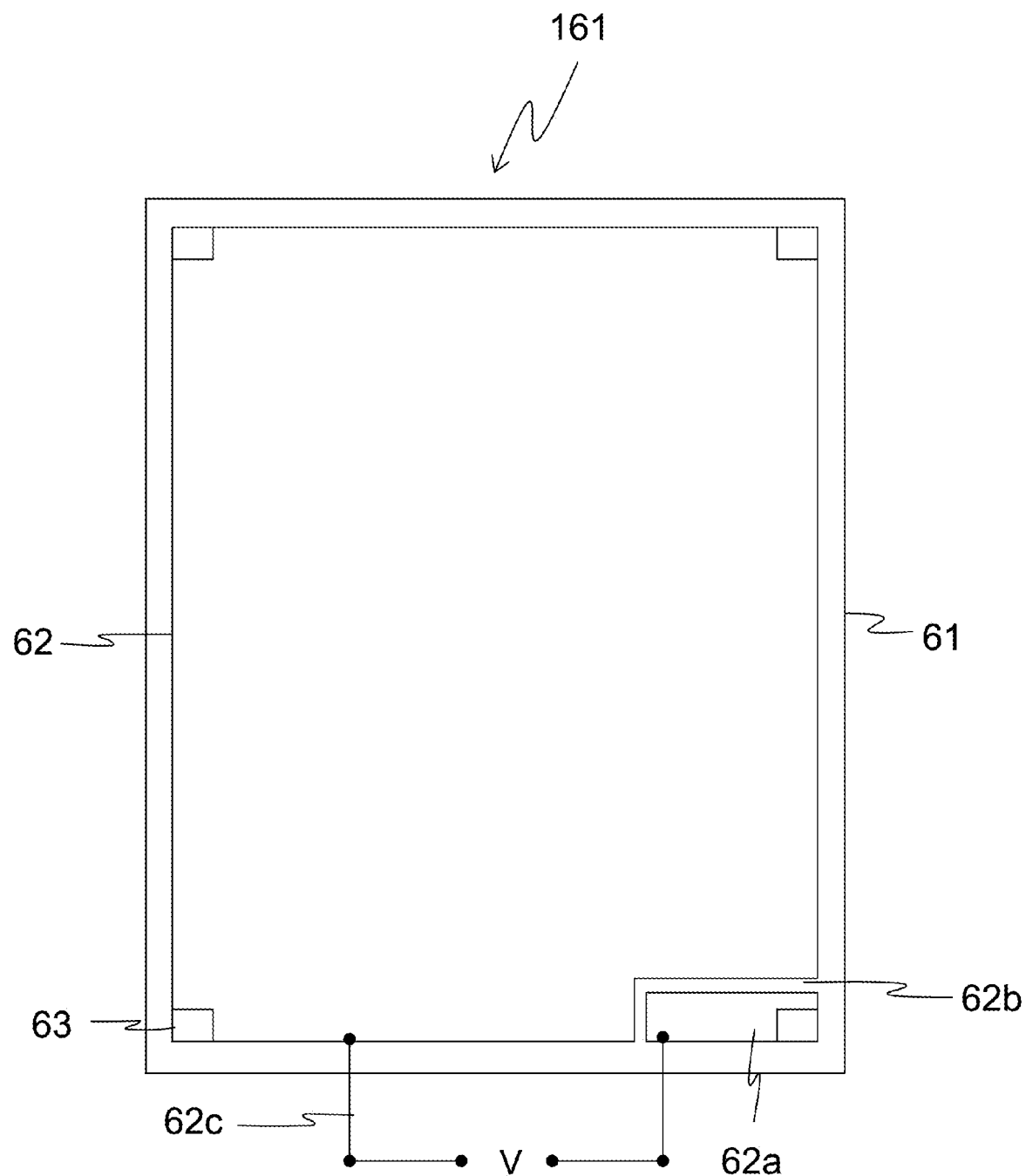
FIG. 7 shows a composition top view of a lower substrate module according to the present disclosure.

As shown in FIG. 6 and FIG. 7, the lower substrate module 161 mainly comprises the lower transparent substrate 61, the lower ITO electrode layer 62, the secondary ITO electrode 62a, and several lower alignment targets 63.

Figure 15:
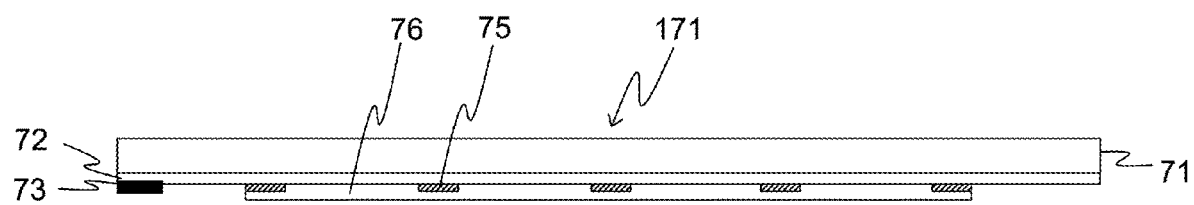
FIG. 15 shows a composition side view of an upper substrate module according to the present disclosure.
Figure 16:
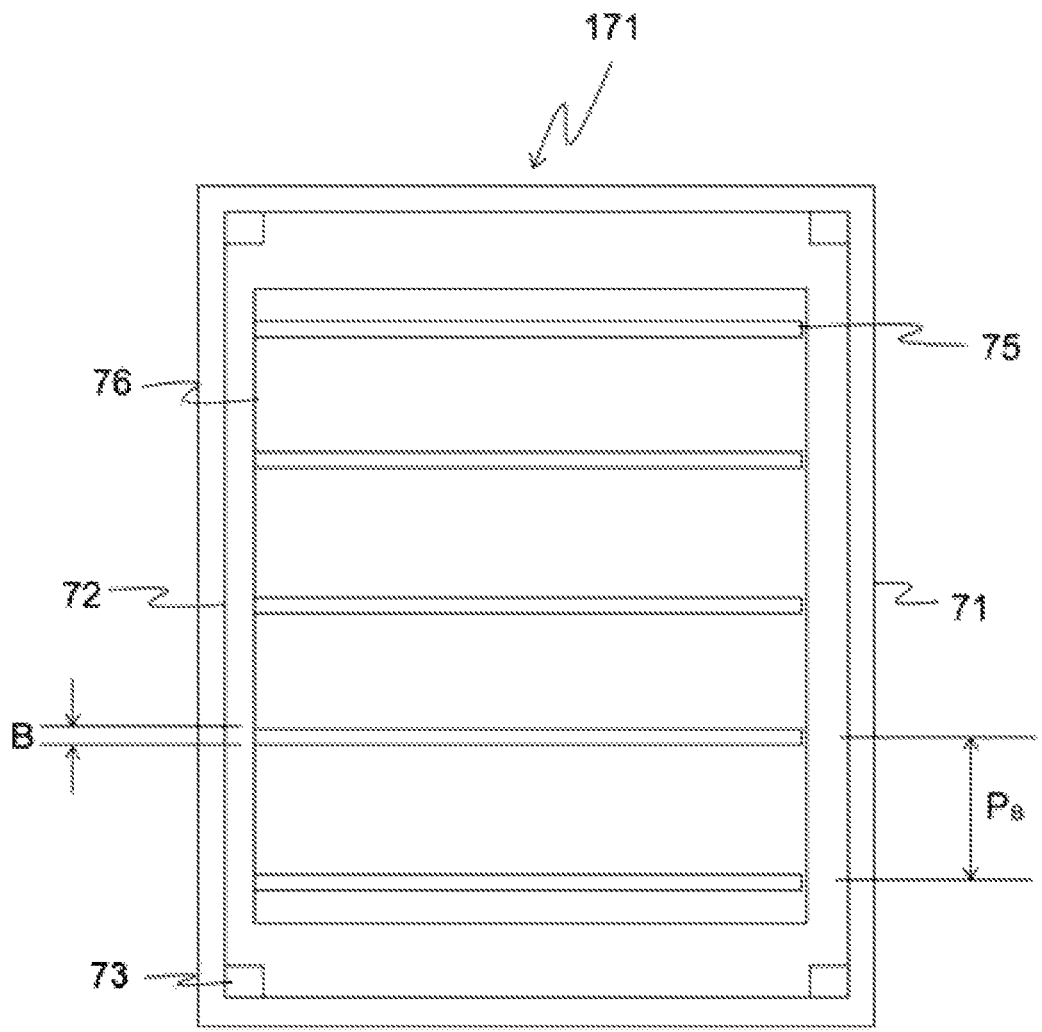
FIG. 16 shows a composition top view of an upper substrate module according to the present disclosure.

As shown in FIG. 15 and FIG. 16, the upper substrate module 171 mainly comprises the upper transparent substrate 71, the upper ITO electrode layer 72, the plurality of shading portions 75, the upper alignment film 76, and several upper alignment targets 73.

FIG. 6 and FIG. 7 show composition schematic diagrams of the lower substrate module. The lower transparent substrate 61 is made of transparent glass, on which the lower ITO electrode layer 62, the secondary ITO electrode 62a, an electrical blocking structure 62b, and the lower alignment targets 63 can be arranged by means of a photo-lithography process.

The electrical blocking structure 62b is arranged between the lower ITO electrode layer 62 and the secondary ITO electrode 62a, so as to electrically isolate the lower ITO electrode layer 62 and the secondary ITO electrode 62a. The secondary ITO electrode 62a is electrically connected to the upper ITO electrode layer 72 through the electrically-conductive structure 83. Besides, the lower ITO electrode layer 62 and the secondary ITO electrode 62a are electrically connected to an external voltage V via a metal conducting wire 62c, separately.

Besides, the lower alignment targets 63 are arranged in place, optimally, at four corners, and are made of metal materials, so as to improve the recognition rates and precision of optical image alignment.

Figure 8:
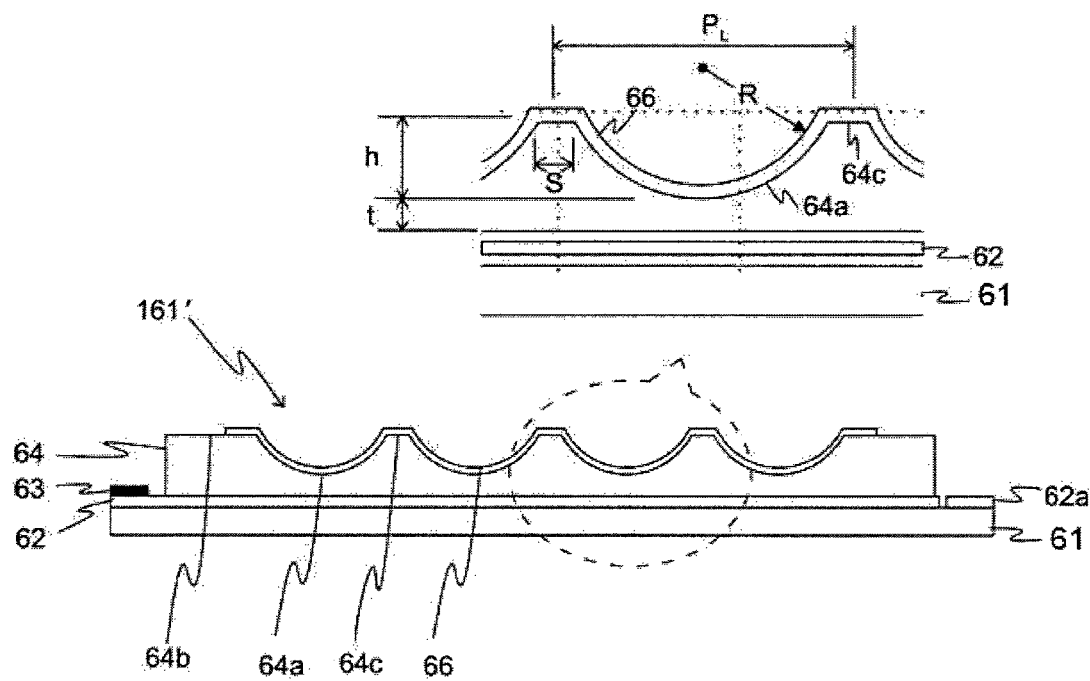
FIG. 8 shows a composition schematic diagram of a plano-concave lens module according to the present disclosure.

As shown in FIG. 8, the plano-concave lens module 64 is made of a transparent material, structurally comprises a plurality of arc-shaped concave lens surfaces 64a, sealing plastic surfaces 64b, a plurality of spacing surfaces 64c and a lower alignment film 66. The plano-concave lens module 64 is arranged on the lower ITO electrode layer 62 of the lower substrate module 161.

Herein, the arc-shaped concave lens surfaces 64a have a radius R, a period unit width $P_L$, a lens height h and a bottom layer thickness t. Generally, in order to reduce a driving voltage of the external power supply V, it is necessary to reduce the lens height h to a great extent in terms of optical design, and it is necessary to reduce the bottom layer thickness t in terms of a process, where optimally, t<10 μm. Certainly, the concave surface may also be selected from a polyhedral concave lens surface (not shown in the figure). The effects on the surface structure and optics of the polyhedral concave lens surface refer to US Patent: U.S. Pat. No. 8,780,188B2 and China Patent: CN102077601B.

Besides, the sealing plastic surfaces 64b are arranged on two sides of the plano-concave lens module 64, and the plurality of spacing surfaces 64c is arranged there between. The spacing surfaces 64c have a width S. The plurality of spacing surfaces 64c is used to support the upper substrate module 171, so as to maintain a uniform cell gap. It is necessary to reduce the width S to a great extent in terms of a process, where optimally, S<10 μm. Besides, as after-mentioned, the arc-shaped concave lens surfaces 64a are used to fill the plurality of liquid crystal molecules 81, so as to form switchable liquid crystal lenticular lenses. The sealing plastic surfaces 64b are used to arrange the sealing plastic structure 82, so as to achieve connection and fixing of the upper substrate module 171 and the lower substrate module 161.

The lower alignment film 66 is generated by coating the surfaces of the plurality of arc-shaped concave lens surfaces 64a and the plurality of spacing surfaces 64c with alignment liquid through processes of spin, or dipping, or relief printing, or inkjet printing, as well as a process of heat drying. Generally, the lower alignment liquid is made of a polyimide material. Besides, the lower alignment film 66 can achieve the aim of arranging the plurality of liquid crystal molecules 81 in the same direction through an alignment process. Generally, the alignment process of the lower alignment film is selected from a rubbing process or a photo-alignment process. Besides, an alignment direction of the lower alignment film is, optimally, a direction parallel to the long axes of the switchable liquid crystal lenticular lenses.

Besides, the plano-concave lens module 64 is made of a transparent material such as glass or UV-cured resin (UV resin for short), and has a refractive index $n_o$; and the plurality of liquid crystal molecules 81 (unmarked in the figure) are made of nematic liquid crystal materials, and have the characteristics of birefringent optics, an ordinary refractive index is $n_o$, and an extraordinary refractive index is $n_e$, where $n_o=n_o$, and $n_e>n_p$.

Herein, when the plano-concave lens module 64 is made of a UV resin material, the plano-concave lens module 64 can be directly arranged on the lower substrate module 161 by means of a plate-to-plate UV-cured manufacturing process.

FIG. 9 to FIG. 13 show schematic diagrams of a plate-to-plate UV-cured manufacturing process. The process refers to: molding the plano-concave lens module 64, which is made of the UV resin, on the lower substrate module 161 through a plane mould and a UV-cured technology.

Figure 9:
FIG. 9 shows a schematic diagram of a plane mould for molding a plano-concave lens module according to the present disclosure.

Firstly, FIG. 9 shows a schematic diagram of a plane mould for molding a plano-concave lens module. The plane mould 64*d* has a structure opposite to that of the plano-concave lens module 64.

Figure 10:
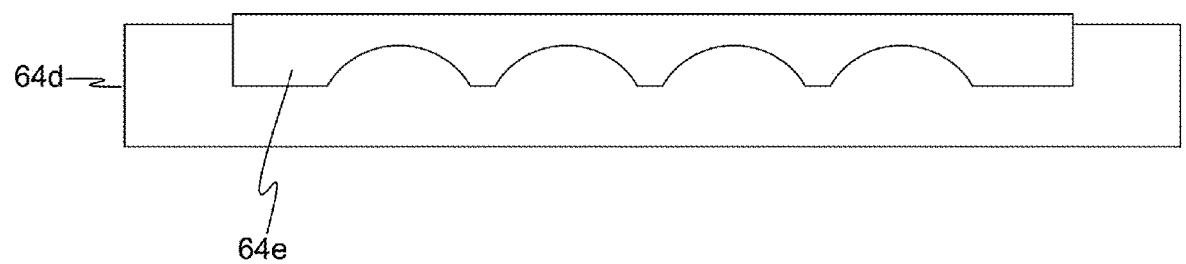
FIG. 10 shows a schematic diagram of a process of filling a plane mould with liquid UV resin according to the present disclosure.

FIG. 10 shows a schematic diagram of a process of filling a plane mould with liquid UV resin. The plane mould 64*d* can be filled with liquid UV resin 64*e* in a manner of inkjet printing.

Figure 11:
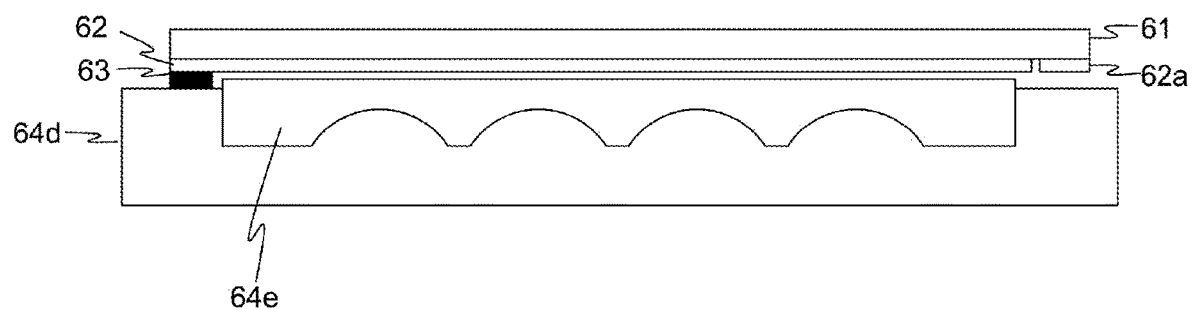
FIG. 11 shows a schematic diagram of a process of pressing a lower substrate module and covering liquid UV resin according to the present disclosure.

FIG. 11 shows a schematic diagram of a process of pressing a lower substrate module and covering liquid UV resin. By means of optical alignment with high accuracy for the lower substrate module 161, the lower ITO electrode layer 62 of the lower substrate module 161 can be accurately pressed on the plane mould 64*d*, and covers the liquid UV resin 64*e*. Besides, in order to avoid mixing of bubbles, the process of pressing and covering is generally carried out in a vacuum cavity.

Figure 12:
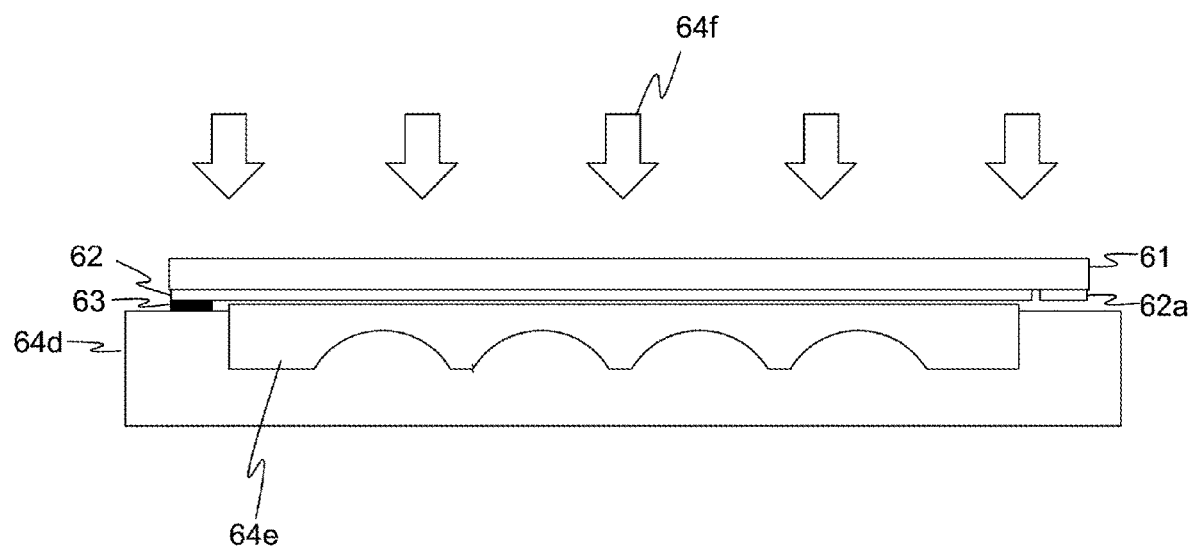
FIG. 12 shows a schematic diagram of a process of curing liquid UV resin according to the present disclosure.

FIG. 12 shows a schematic diagram of a process of curing liquid UV resin. Generally, the liquid UV resin 64*e* of the plane mould 64*d* is irradiated by a parallel UV light source 64*f*, which has an appropriate wavelength and light intensity, for an appropriate time, so as to achieve the aim of curing the liquid UV resin.

Figure 13:
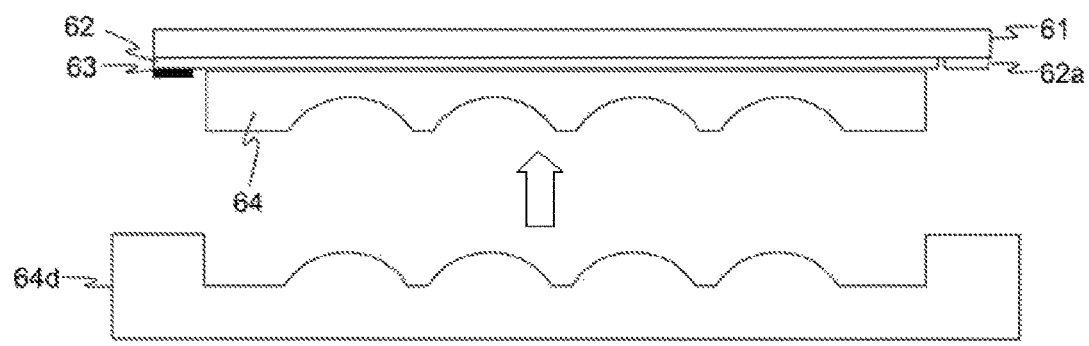
FIG. 13 shows a schematic diagram of de-molding of a concave lens module according to the present disclosure.

FIG. 13 shows a schematic diagram of de-molding of a concave lens module. The cured liquid UV resin is de-molded, and finally, the plano-concave lens module 64 can be directly molded on the lower ITO electrode layer 62 of the lower substrate module 161.

Figure 14:
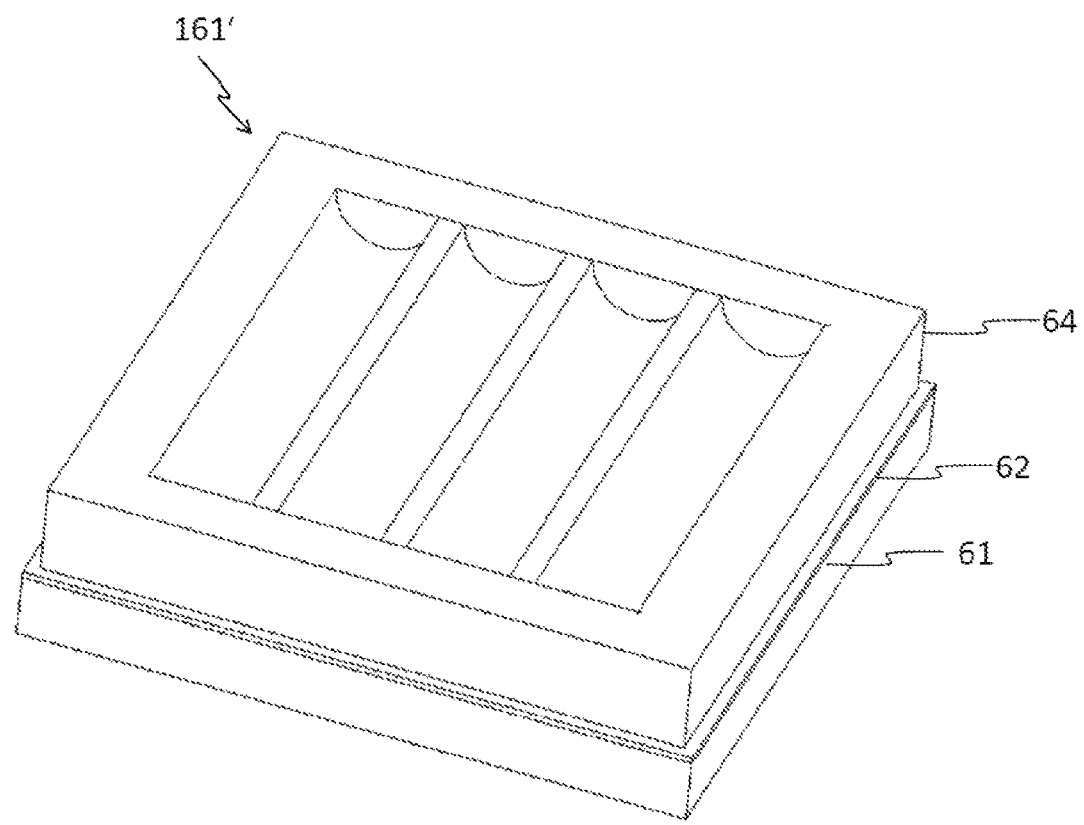
FIG. 14 shows a schematic diagram of a 3D structure of a lens substrate module according to the present disclosure.

FIG. 14 shows a schematic diagram of a 3D structure of a lens substrate module. For convenience of illustration hereinafter, a lower lens substrate module 161' consists of the plano-concave lens module 64 and the lower substrate module 161.

FIG. 15 and FIG. 16 show composition schematic diagrams of the upper substrate module. The upper transparent substrate 71 is made of transparent glass. The upper ITO electrode layer 72 and the upper alignment targets 73 can be arranged on the upper transparent substrate 71 by means of a photo-lithography process. Besides, a plurality of shading portions 75, which is made of black photo-resistor, is arranged on the upper ITO electrode layer 72 by means of the photo-lithography process. The plurality of shading portions 75 has a period unit width $P_B$ and a line width B, where with respect to the period unit width $P_L$ of the arc-shaped concave lens surfaces and the width S of the spacing surfaces 64*c*, $P_B=P_L$, and B>S. Under a 3D image mode, a phenomenon of cross-talk will be caused to light through the plurality of spacing surfaces 64*c*. So, the plurality of shading portions 75 may be aligned, as aftermentioned, to the plurality of spacing surfaces 64*c* in a one-to-one correspondence manner after precision alignment assembly of the upper and lower substrate modules, and the aim of shading the light causing cross-talk to improve the quality of a 3D image can be achieved.

Besides, the upper alignment film 76 is generated by coating the surfaces of the upper ITO electrode layer 72 and the plurality of shading portions 75 with alignment liquid through processes comprising spin, or dipping, or relief printing, or inkjet printing, as well as a process of heat drying. Generally, the alignment liquid is made of a polyimide material. Besides, the upper alignment film 76 can achieve the aim of arranging the plurality of liquid crystal molecules 81 in the same direction through an alignment process. Generally, the alignment process of the lower alignment film is selected from a rubbing process or a photo-alignment process. Besides, an alignment direction of the upper alignment film is, optimally, parallel to a linear polarization direction of an image incident light as shown in FIG. 5, the incident light containing a 2D/3D image and being emitted from the end of the upper substrate module 171.

FIG. 17 to FIG. 20 show schematic diagrams of a process of assembling the upper substrate module and the lower lens substrate module. The process mainly refers to: arranging the plurality of liquid crystal molecules 81, the sealing plastic structure 82 and the electrically-conductive structure 83 on the lower lens substrate module 161', and then connecting and fixing the upper substrate module 171 and the lower lens substrate module 161', so as to finally produce the surface relief liquid crystal lenticular device 60.

Figure 17:
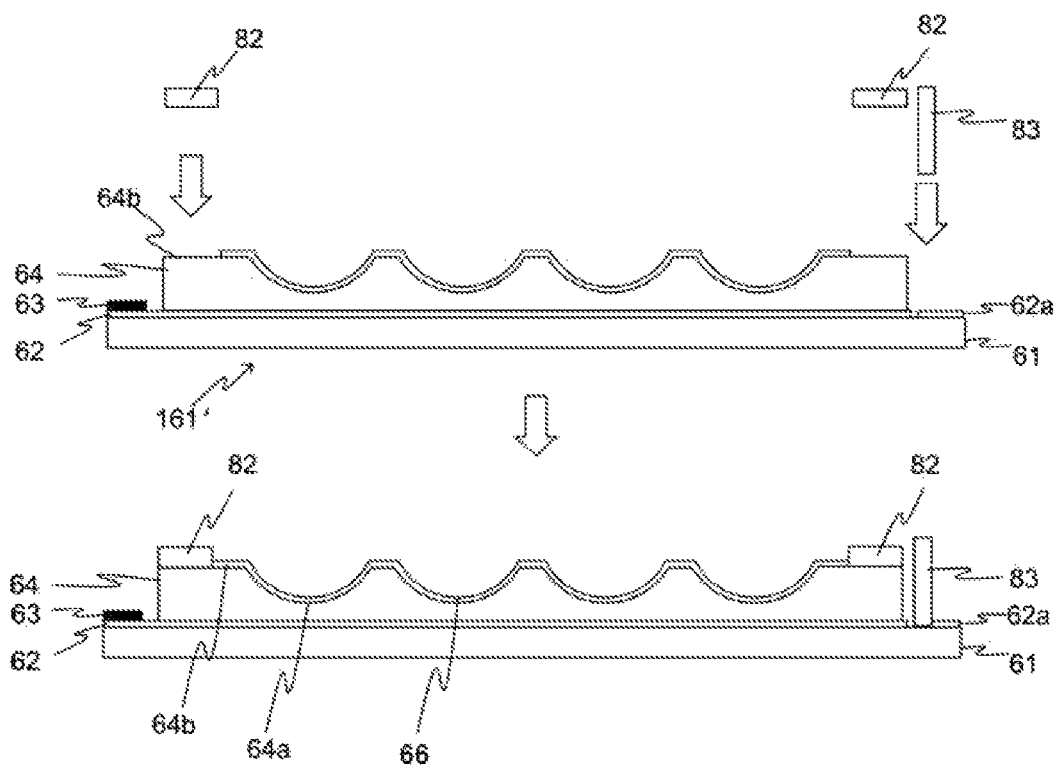
FIG. 17 shows a schematic diagram of a process of assembling a sealing plastic structure and an electrically-conductive structure according to the present disclosure.

FIG. 17 shows a schematic diagram of a process of assembling a sealing plastic structure and an electrically-conductive structure. The sealing plastic structure 82 is made of UV resin. The sealing plastic structure 82 can be arranged on the sealing plastic surface 64*b* by means of processes of precision alignment and precision dispensing as well as UV pre-curing. The process is generally referred to as a sealing plastic process, so as to achieve the aims of connecting and fixing the upper substrate module 171 and the lower substrate module 161 and sealing the plurality of liquid crystal molecules 81.

Besides, the electrically-conductive structure 83 is made of conductive silver paste, and the electrically-conductive structure 83 can be arranged on the second ITO electrode 62*a* by means of processes of precision alignment and precision dispensing. The process is generally referred to as a silver paste dispensing process, used to electrically connect the upper ITO electrode layer 72 and the external voltage V.

Figure 18:
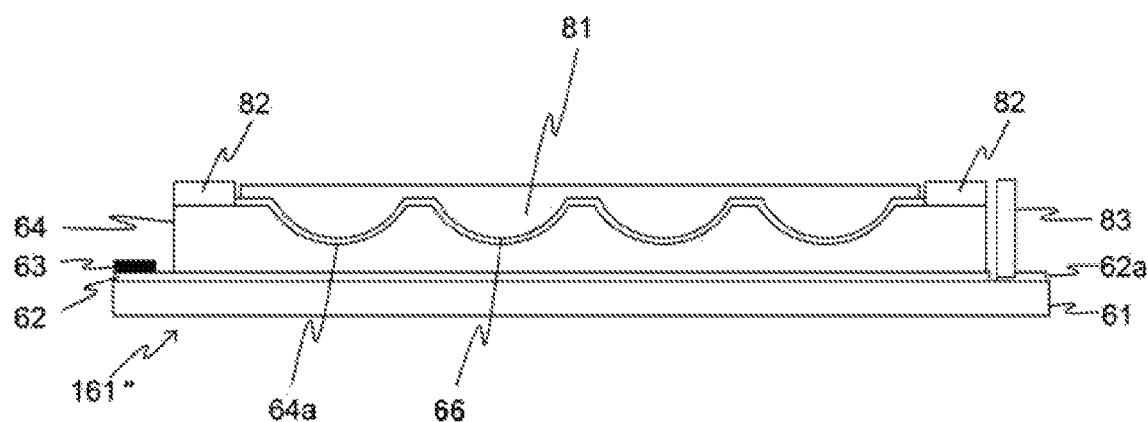
FIG. 18 shows a schematic diagram of an ODF assembly process according to the present disclosure.

FIG. 18 shows a schematic diagram of an ODF (On Drop Filling) assembly process. The plurality of liquid crystal molecules 81 can be filled in the arc-shaped concave lens surfaces 64*a* by means of processes of precision alignment and ODF, so as to form switchable liquid crystal lenticular lenses. The process is generally referred to as an ODF process.

The lower lens substrate module 161' completing the sealing plastic process, the silver paste dispensing process and the ODF process is hereinafter collectively referred to as a lower lens liquid crystal cell module 161". Certainly, according to demands for a production effect of an actual production line, an object subjected to the sealing plastic process or the silver paste dispensing process is not limited to the lower lens substrate module 161' and may be the upper substrate module 171.

Figure 19:
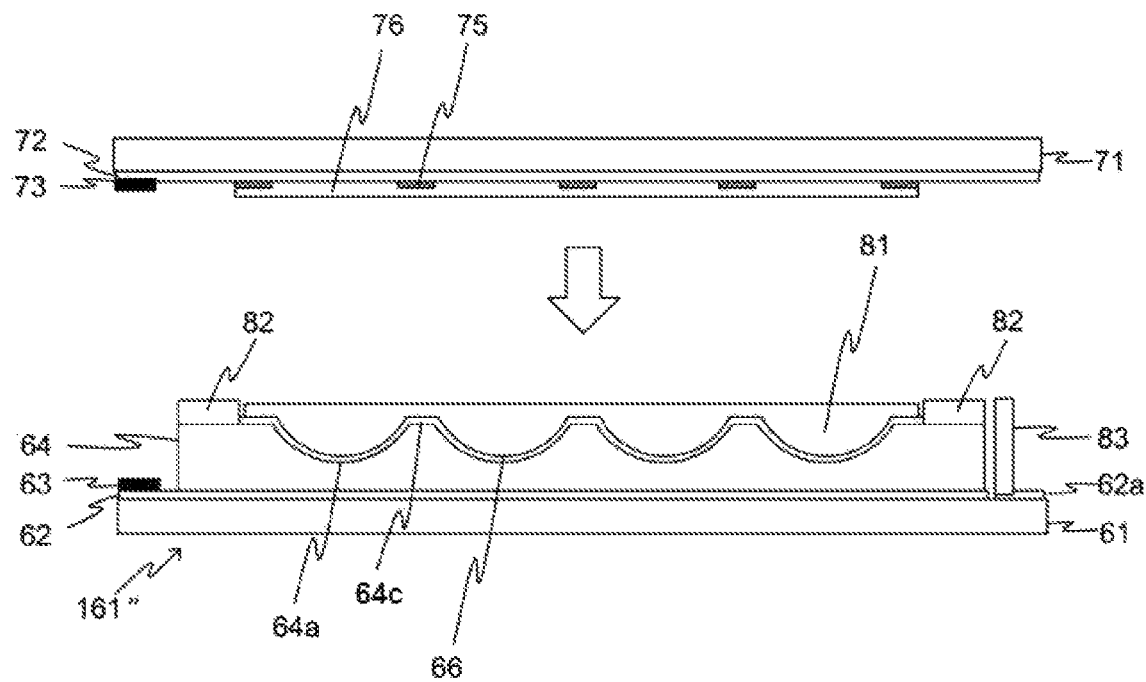
FIG. 19 shows a schematic diagram of a process of assembling an upper substrate module and a lower lens liquid crystal cell module according to the present disclosure.
Figure 20:
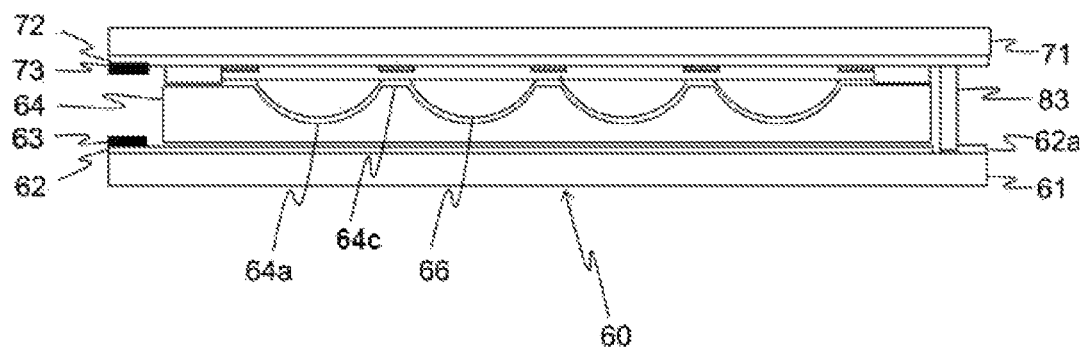
FIG. 20 shows a schematic diagram of a finished product of a surface relief liquid crystal lenticular device according to the present disclosure.
Figure 21:
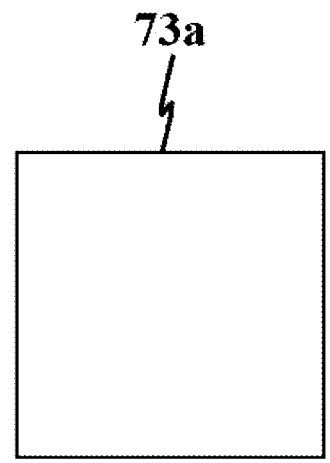
FIG. 21 shows a schematic diagram of a geometric shape of a square alignment target according to the present disclosure.
Figure 22:
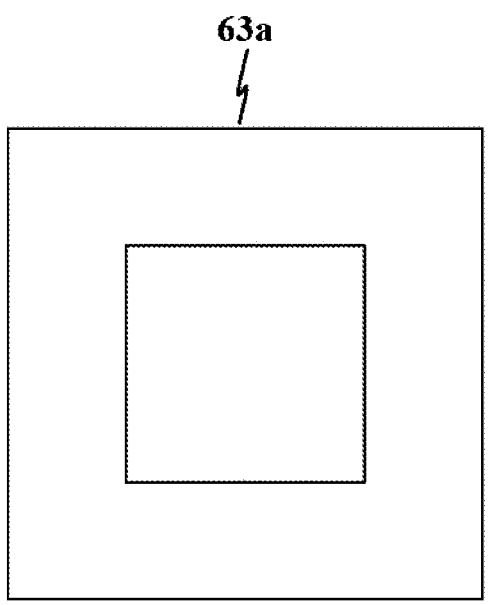
FIG. 22 shows a schematic diagram of a geometric shape of a square ring alignment target according to the present disclosure.
Figure 23:
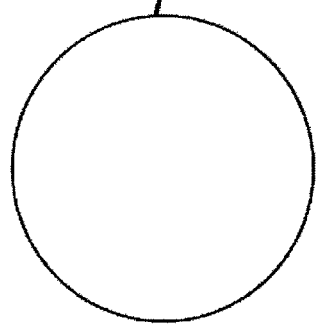
FIG. 23 shows a schematic diagram of a geometric shape of a circular alignment target according to the present disclosure.
Figure 24:
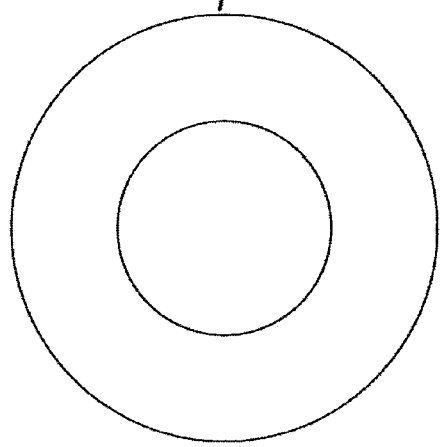
FIG. 24 shows a schematic diagram of a geometric shape of a circular ring alignment target according to the present disclosure.
Figure 25:
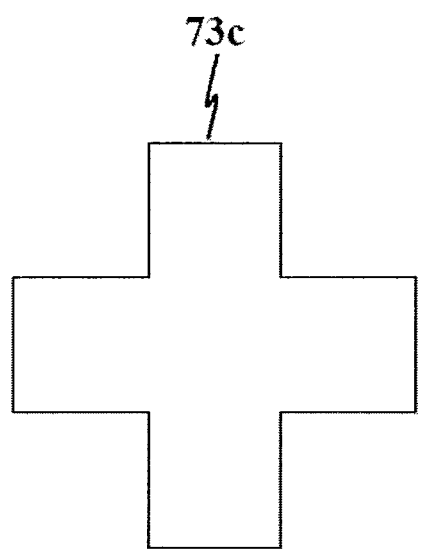
FIG. 25 shows a schematic diagram of a geometric shape of a cross alignment target according to the present disclosure.
Figure 26:
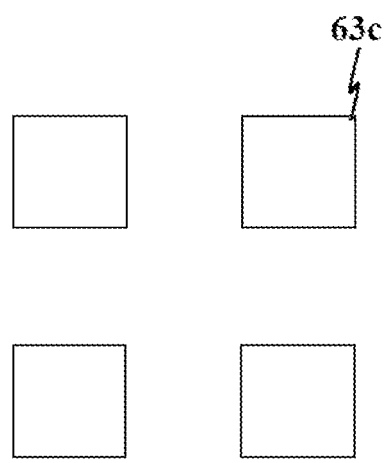
FIG. 26 shows a schematic diagram of a geometric shape of a reverse cross alignment target according to the present disclosure.

FIG. 19 shows a schematic diagram of a process of assembling an upper substrate module and a lower lens liquid crystal cell module. The upper substrate module 171 and the lower lens liquid crystal cell module 161" can be bonded by means of processes of precision alignment and vacuum attaching. Finally, after the sealing plastic structure 82 is irradiated and cured by the UV light source 84, as shown in FIG. 20, the surface relief liquid crystal lenticular device 60 of the present patent can be produced.

As shown in FIG. 7, when V=OFF, the optical characteristics of the surface relief liquid crystal lenticular device 60 are applicable to display of a 3D image; and when V=ON, the optical characteristics of the surface relief liquid crystal lenticular device 60 are applicable to display of a 2D image, so as to achieve the aim of 2D and 3D image switchable display.

Besides, geometric shape compositions of the upper alignment target 73 and the lower alignment target 63 can be separately selected, as shown in FIG. 21 to FIG. 26, from a square structure 73a and a square ring structure 63a having complementary geometric shapes, or can be separately selected from a circular structure 73b and a circular ring structure 63b having complementary geometric shapes, or can be separately selected from a cross structure 73c and a reverse cross structure 63c having complementary geometric shapes. Besides, geometric dimensions of the upper and lower alignment targets 73a, 63a, 73b, 63b, 73c and 63c can be ten to hundreds of microns (μm).

The present disclosure improves the common surface relief liquid crystal lenticular device and gives a 2D and 3D switchable device that is truly producible and usable.

The present disclosure provides a surface relief liquid crystal lenticular device, which comprises:

a lower substrate module, comprising a lower transparent substrate, a lower ITO electrode layer, a secondary ITO electrode, and an electrical blocking structure, the lower ITO electrode layer and the secondary ITO electrode being located on the surface of the same side of the lower transparent substrate respectively, and the electrical blocking structure being located between the lower ITO electrode layer and the secondary ITO electrode;

an upper substrate module, located above the lower substrate module, and including an upper transparent substrate, an upper ITO electrode layer, a plurality of shading portions, and an upper alignment film, wherein the upper ITO electrode layer is located on the surface of one side, close to the lower substrate module, of the upper transparent substrate; the shading portions are arranged on the surface of one side, away from the upper transparent substrate, of the upper ITO electrode layer at intervals, and the upper alignment film is located on the surface of one side, away from the upper transparent substrate, of the upper ITO electrode layer and the shading portions;

a plano-concave lens module, the plano-concave lens module including an upper surface facing the upper substrate module, and a lower alignment film, the upper surface including a plurality of concave lens surfaces, spacing surfaces and sealing plastic surfaces, wherein the spacing surfaces are arranged between the adjacent concave lens surfaces and connected to the concave lens surfaces, the lower alignment film is located on the surfaces of the concave lens surfaces and the spacing surfaces, the concave lens surfaces and the spacing surfaces are located in an area encircled by the sealing plastic surfaces, and the plano-concave lens module is arranged between the lower substrate module and the upper substrate module;

a plurality of liquid crystal molecules, arranged in a groove formed by the concave lens surfaces, and driven by the upper ITO electrode layer, the lower ITO electrode layer and a voltage of an external power supply, so as to form a plurality of liquid crystal lenticular lenses;

a sealing plastic structure, arranged on the sealing plastic surfaces, and used to connect and fix the upper substrate module and the plano-concave lens module and to seal the liquid crystal molecules; and an electrically-conductive structure, connected to the upper ITO electrode layer and the secondary ITO electrode, wherein the external power supply is electrically connected to the lower ITO electrode layer and the secondary ITO electrode, the plurality of liquid crystal lenticular lenses being driven by a voltage V to achieve an aim of 2D and 3D switchable display.

In the surface relief liquid crystal lenticular device, ITO is arranged in two planes, may form a uniform electric field, and can well control arrangement of the liquid crystal molecules.

In a preferable implementation mode, on the surface of one side, away from the lower transparent substrate, of the lower ITO electrode layer and/or on the surface of one side, away from the lower transparent substrate, of the secondary ITO electrode there are also a plurality of lower alignment targets; and on the surface of one side, away from the upper ITO electrode layer, there are also a plurality of upper alignment targets. By arranging the upper alignment targets and the lower alignment targets, the recognition rates and precision of optical image alignment can be improved.

In a preferable implementation mode, the transparent material of the plano-concave lens module has a refractive index $n_p$, and is selected from glass or UV-cured resin; and the liquid crystal molecules are nematic liquid crystal materials, and have the characteristics of birefringent optics, an ordinary refractive index of the liquid crystal molecule is $n_o$, and an extraordinary refractive index is $n_e$, where $n_o = n_p$, and $n_e > n_p$.

In a practical application process, preferably, an alignment direction of the lower alignment film is a direction parallel to the long axes of the liquid crystal lenticular lenses. When a driving voltage is OFF, the liquid crystal molecules present the ordinary refractive index $n_o$, so as to achieve 3D display; and when a driving voltage is ON, the liquid crystal molecules present the extraordinary refractive index $n_e$, so as to achieve 2D display.

Alternatively, the concave lens surfaces are arc-shaped concave lens surfaces or polyhedral concave lens surfaces. When the concave lens surfaces are selected from arc-shaped concave lens surfaces, a bottom layer thickness t is smaller than $10^{\mu m}$. More preferably, the arc-shaped concave lens surfaces have a period unit width $P_L$, the width of the spacing surfaces is S, and the shading portions have a period unit width $P_B$ and a line width B, where $P_B = P_L$, and $B > S$; and the shading portions are aligned to the spacing surfaces in a one-to-one correspondence manner in arrangement position. Such arrangement can achieve the aims of shading light causing cross-talk and improving the quality of a 3D image.

Preferably, the width S of the spacing surfaces is smaller than 10 μm.

Preferably, the sealing plastic structure is made of UV-cured resin, the electrically-conductive structure is made of conductive silver paste, and the shading portions are made of black photo-resistors.

According to another aspect of the present disclosure, a display device is also provided, which includes an image incident light and a surface relief liquid crystal lenticular device, wherein the surface relief liquid crystal lenticular device is the surface relief liquid crystal lenticular device described as above, the image incident light having a linear polarization direction, and an alignment direction of an upper alignment film in the surface relief liquid crystal lenticular device being parallel to the polarization direction of the image incident light.

What is claimed is:

1. A method for manufacturing a surface relief liquid crystal lenticular device, surface relief liquid crystal lenticular device comprising:
  a lower substrate module, consisting of a lower transparent substrate, a lower ITO electrode layer, a secondary ITO electrode, an electrical blocking structure, and several lower alignment targets,
  an upper substrate module, consisting of an upper transparent substrate, an upper ITO electrode layer, a plurality of shading portions, several upper alignment targets, and an upper alignment film;
  a plano-concave lens module comprising a plano-concave lens mold made of a transparent material, a plurality of concave lens surfaces, a sealing plastic surface, a plurality of spacing surfaces and a lower alignment film, the plano-concave lens module is arranged on the lower ITO electrode layer of the lower substrate module;
  a plurality of liquid crystal molecules, arranged in the concave lens surfaces, and driven by the upper ITO electrode layer, the lower ITO electrode layer and a voltage of an external power supply, so as to form a plurality of liquid crystal lenticular lenses;
  a sealing plastic structure, arranged on the sealing plastic surface, and used to connect and fix the upper substrate module and the lower substrate module and to seal the plurality of liquid crystal molecules; and
  an electrically-conductive structure, arranged on the secondary ITO electrode to connect and conduct to the upper ITO electrode layer,
  wherein the external power supply is electrically connected to the lower ITO electrode layer and the secondary ITO electrode, the plurality of liquid crystal lenticular lenses being driven by a voltage V to achieve an aim of 2D and 3D switchable display;
  the liquid crystal molecules cover the plurality of concave lens surfaces, and the concave lens surfaces are selected from arc-shaped concave lens surfaces, wherein the arc-shaped concave lens surfaces have a radius R, a period unit width PL, a lens height h and a bottom layer thickness t, the bottom layer thickness t is smaller than 10 μm; the plurality of spacing surfaces is arranged between the sealing plastic surfaces and is used to support the upper substrate module to maintain a uniform cell gap, each spacing surface having a width S, the width S of the spacing surface is smaller than 10 μm; the plurality of shading portions has a period unit width PB and a line width B, where PB=PL, and B>S, the plurality of shading portions is aligned to the plurality of spacing surfaces in a one-to-one correspondence manner in arrangement position, and can shade light of cross-talk at the plurality of spacing surfaces;

the method comprising:
  a first step: forming a lower ITO electrode layer, a secondary ITO electrode, an electrical blocking structure and several lower alignment targets on a lower transparent substrate through a photo-lithography process, so as to prepare a lower substrate module; forming an upper ITO electrode layer, a plurality of shading portions, and several upper alignment targets on an upper transparent substrate through a photo-lithography process, so as to prepare an upper substrate module;
  a second step: providing a plane mould, which has a mold structure opposite to that of a plano-concave lens module; filling the plane mould with liquid UV-cured resin through a process of precision inkjet printing; through precision photo-alignment to the lower substrate module in a vacuum cavity, precisely pressing the lower ITO electrode layer of the lower substrate module onto the plane mould and covering the liquid UV-cured resin; irradiating UV light to the liquid UV-cured resin in the plane mould, so as to cure the liquid UV-cured resin and mold the plano-concave lens module; and taking out the plano-concave lens module from the plane mould through a de-molding process, and fixedly arranging the plano-concave lens module on the lower ITO electrode layer of the lower substrate module;
  a third step: coating the surfaces of a plurality of concave lens surfaces and a plurality of spacing surfaces with alignment liquid through processes comprising spin, or dipping, or relief printing, or inkjet printing, as well as a process of heat drying, so as to generate a lower alignment film; and coating the surfaces of the upper ITO electrode layer and the plurality of shading portions with alignment liquid through processes of spin, or dipping, or relief printing, or inkjet printing, as well as a process of heat drying, so as to generate an upper alignment film;
  a fourth step: making an alignment direction of the upper alignment film parallel to a linear polarization direction of an image incident light through an alignment process, and making an alignment direction of the lower alignment film parallel to the long axes of switchable liquid crystal lenticular lenses through an alignment process;
  a fifth step: arranging a sealing plastic structure on a sealing plastic surface through processes of precision alignment, precision dispensing and UV pre-curing;
  a sixth step: drop filling a plurality of liquid crystal molecules into a concave lens surface through an On Drop Filling process;
  a seventh step: arranging an electrically-conductive structure on the secondary ITO electrode through processes of precision alignment and precision dispensing; and
  an eighth step: bonding the upper substrate module and the lower substrate module through processes of precision alignment and vacuum attaching, and irradiating UV light to make the sealing plastic structure cured, so as to form the surface relief liquid crystal lenticular device.

2. The method as claimed in claim 1, wherein both the lower transparent substrate and the upper transparent substrate are made of transparent glass.

3. The method as claimed in claim 1, wherein the lower ITO electrode layer and the secondary ITO electrode are separately electrically connected to the external power supply.

4. The method as claimed in claim 1, wherein the plurality of shading portions are made of black photo-resistors.

5. The method as claimed in claim 1, wherein the several lower alignment targets are arranged at four corners of the lower transparent substrate, and the several lower alignment targets are made of metal materials; or, the several upper alignment targets are arranged at four corners of the upper transparent substrate, and the several upper alignment targets are made of metal materials.

6. The method as claimed in claim 1, wherein the transparent material of the plano-concave lens module has a refractive index $n_p$, and is UV-cured resin.

7. The method as claimed in claim 1, wherein the sealing plastic surfaces are arranged on two sides of the plano-concave lens module.

8. The method as claimed in claim 1, wherein an alignment direction of the lower alignment film is a direction parallel to the long axes of the liquid crystal lenticular lenses.

9. The method as claimed in claim 6, wherein the plurality of liquid crystal molecules are made of nematic liquid crystal materials, and have the characteristics of birefringent optics in which an ordinary refractive index is $n_o$ and an extraordinary refractive index is $n_e$, where $n_o=n_p$, and $n_e>n_p$.

10. The method as claimed in claim 1, wherein the sealing plastic structure is made of UV-cured resin, the electrically-conductive structure is made of conductive silver paste.

11. The method as claimed in claim 1, wherein when the voltage of the external power supply satisfies V=OFF, the optical characteristic of the surface relief liquid crystal lenticular device is applicable to display of a 3D image; and when V=ON, the optical characteristic of the surface relief liquid crystal lenticular device is applicable to display of a 2D image.

12. The method as claimed in claim 1, wherein geometric structures of the upper alignment target and the lower alignment target comprise either: respective square structures and square ring structures having complementary geometric shapes, or respective circular structures and circular ring structures having complementary geometric shapes, or respective cross structures and reverse cross structures having complementary geometric shapes.

13. The manufacturing method as claimed in claim 1, wherein the alignment process is selected from a rubbing process or a photo-alignment process.

14. The manufacturing method as claimed in claim 1, wherein the alignment liquid is made of a polyimide material.

15. The method as claimed in claim 1, comprising:
the lower substrate module, comprising the lower transparent substrate, the lower ITO electrode layer, the secondary ITO electrode, and the electrical blocking structure, the lower ITO electrode layer and the secondary ITO electrode being located on the surface of the same side of the lower transparent substrate respectively, and the electrical blocking structure being located between the lower ITO electrode layer and the secondary ITO electrode;
the upper substrate module, located above the lower substrate module, and comprising the upper transparent substrate, the upper ITO electrode layer, a plurality of shading portions, and the upper alignment film, wherein the upper ITO electrode layer is located on the surface of one side, close to the lower substrate module, of the upper transparent substrate; the shading portions are arranged on the surface of one side, away from the upper transparent substrate, of the upper ITO electrode layer at intervals, and the upper alignment film is located on the surface of one side, away from the upper transparent substrate, of the upper ITO electrode layer and the shading portions;
the plano-concave lens module, the plano-concave lens module comprising an upper surface facing the upper substrate module and the lower alignment film, the upper surface comprising a plurality of concave lens surfaces, spacing surfaces and sealing plastic surfaces, wherein the spacing surfaces are arranged between the adjacent concave lens surfaces and connected to the concave lens surfaces, the lower alignment film is located on the surfaces of the concave lens surfaces and the spacing surfaces, the concave lens surfaces and the spacing surfaces are located in an area encircled by the sealing plastic surfaces, and the plano-concave lens module is arranged between the lower substrate module and the upper substrate module;
a plurality of liquid crystal molecules, arranged in a groove formed by the concave lens surfaces, and driven by the upper ITO electrode layer, the lower ITO electrode layer and the voltage of an external power supply, so as to form a plurality of liquid crystal lenticular lenses;
the sealing plastic structure, arranged on the sealing plastic surfaces, and used to connect and fix the upper substrate module and the plano-concave lens module and to seal the liquid crystal molecules; and
the electrically-conductive structure, connected to the upper ITO electrode layer and the secondary ITO electrode,
wherein the external power supply is electrically connected to the lower ITO electrode layer and the secondary ITO electrode, the plurality of liquid crystal lenticular lenses being driven by a voltage V to achieve an aim of 2D and 3D switchable display.

16. The method as claimed in claim 15, wherein on the surface of one side, away from the lower transparent substrate, of the lower ITO electrode layer and/or on the surface of one side, away from the lower transparent substrate, of the secondary ITO electrode, there are also a plurality of lower alignment targets; and on the surface of one side, away from the upper ITO electrode layer, there are also a plurality of upper alignment targets.

* * * * *